UNITED STATES PATENT OFFICE.

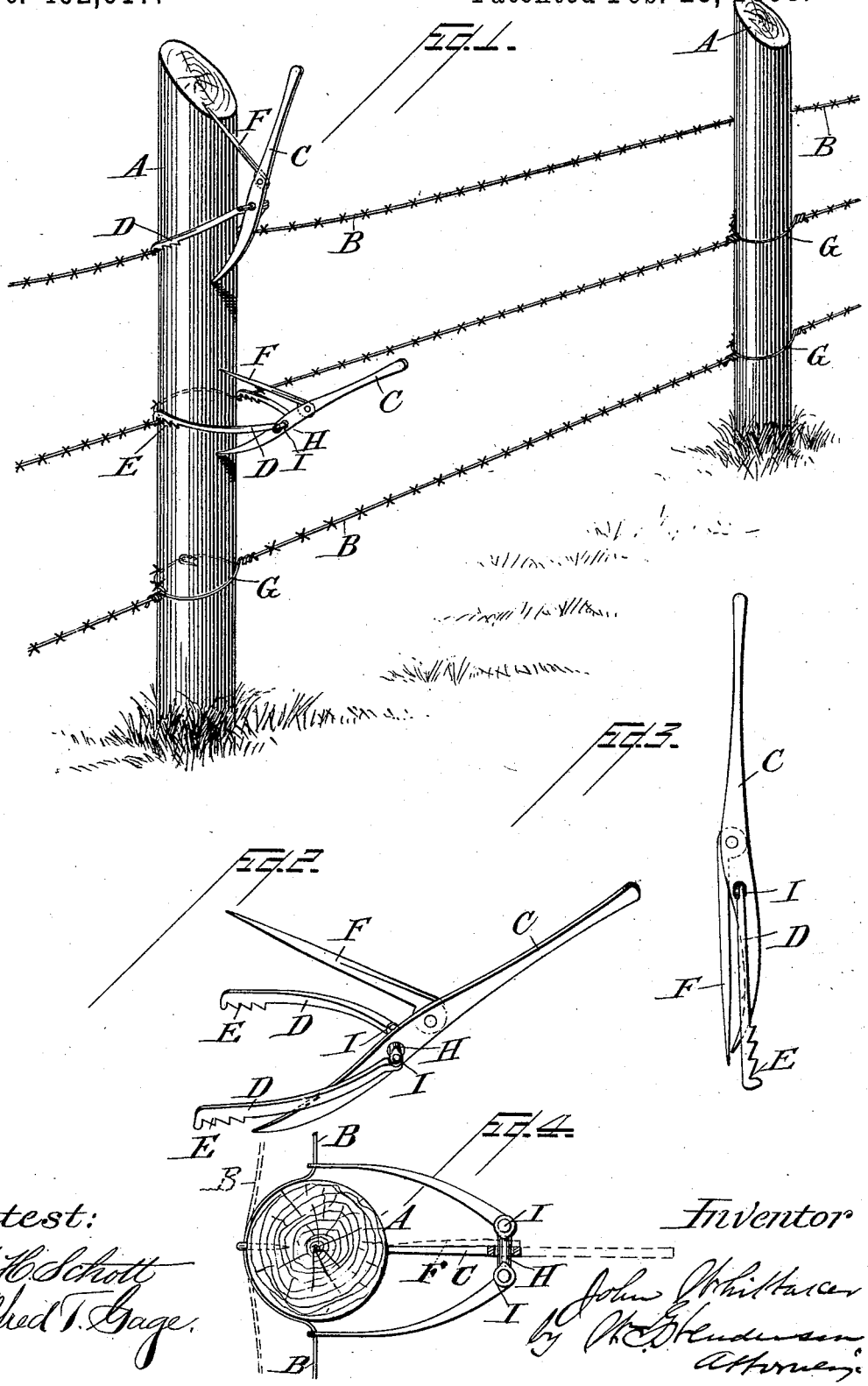

JOHN WHITTAKER, OF McCOOK, NEBRASKA.

IMPLEMENT FOR TIGHTENING FENCE-WIRE STRANDS.

SPECIFICATION forming part of Letters Patent No. 492,617, dated February 28, 1893.

Application filed June 10, 1892. Serial No. 436,234. (No model.)

*To all whom it may concern:*

Be it known that I, JOHN WHITTAKER, a citizen of the United States, residing at McCook, in the county of Red Willow and State of Nebraska, have invented certain new and useful Improvements in Implements for Tightening Fence-Wire Strands; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to means for applying and tightening wire fence strands, and it has for its object to draw the wire around the fence post and securely hold it taut while a supplemental piece of wire is passed around the post and entwined with the fence strand for the purpose of securely binding the fence strand to the post after the slack is taken up.

To the accomplishment of the foregoing object the invention consists in the construction and the combination of parts hereinafter particularly described and then sought to be specifically defined by the claims, reference being had to the accompanying drawings forming a part hereof in which Figure 1 represents a perspective of a section of wire fence showing the tightening and holding device or implement applied in two positions to illustrate the manner of its application and use. Fig. 2 is a perspective of the device or implement with its elements distended as in use. Fig. 3 is a side view of the device or implement with its elements folded or out of use; and Fig. 4 a transverse section through a post and the device or implement, representing the latter in operative position.

In the drawings the letter A represents the fence post and B the wire strand of the fencing extending from one post to the other. In constructing a fence of this character it is desirable after the strands have been placed in position to take up any slack in the same and to secure them firmly to the fence post in a manner that will prevent them from slipping or moving lengthwise. To do this effectively and expeditiously I form an implement or device embracing the general features of the implement illustrated in the drawings. This device or implement comprises a lever C having pivotally connected or hinged thereto two arms D designed to straddle or lie on opposite sides of the fence post and provided with teeth or serrations E designed to engage with the wire fence strand on opposite sides of the post, and also having hinged or pivotally connected thereto a finger or prong F designed when the implement has been moved into position to draw the wire strand around the post to the extent desired to bear against or enter the post so as to hold the implement in its adjusted position which will in turn hold the fence strand in the position in which it has been drawn until the binding wire G can be entwined about the fence strand B to hold it permanently in its position as illustrated in Fig. 1 of the drawings.

The implement is manipulated by passing the arms D to opposite sides of the post and engaging their notched ends with the wire fence strand with the inner end of the lever bearing against the fence post as illustrated in the upper part of Fig. 1; then by bearing down upon the handle end of the lever the arms D are depressed so as to bring them nearer to a horizontal position by which movement the slack in the wire strand is taken up and the surplus wire drawn around the fence post, and when the wire has been drawn to the extent desired the prong F is thrown or pressed downward until its point pierces or presses against the fence post at a point which will hold the lever and the hinged arms to the position to which they have been adjusted so as to securely hold the fence strand to its tightened position while the operator is free to have the use of his two hands in entwining the binding or securing wires G to the fence strand, the binding wire passing around the fence-post as illustrated in Fig. 1, in the lower part of said figure, in order that the fence strand may be secured in the position in which it has been drawn and thus slipping of the fence strand lengthwise prevented.

This device or implement being of few parts and simple in its construction can be expeditiously manipulated by unskilled help in the erection of wire fences; and it also enables the slack in the fence strand to be taken up most effectively, and said strands to be secured without possibility of the same afterward slipping or moving lengthwise; and also enables the strands to be drawn tighter and held in that condition than when the slack is otherwise taken up and the strands secured to the post.

It will be observed that the arms D are connected to the lever C in a manner that will permit them not only to swing in a vertical plane to and from the lever but also so as to swing laterally or sidewise from the lever, which may be effected as illustrated in the drawings by the bolt H passed through the lever C so as to constitute a pivot on which the lever may turn or by which the arms may be swung upon the lever, the lateral or sidewise movement of the arms being secured by hinging them to the two opposite ends of this pivot bolt as illustrated at I in Figs. 2 and 4 of the drawings. While this is the preferred construction I do not propose to limit myself thereto, nor to the details of construction and arrangement of the several parts as it is obvious that they may be varied without departing from the spirit of the invention.

It will be observed that by the method of tightening the wire strands by drawing the strand around the fence post and thus taking up the slack on both sides of the post and disposing of it or the surplus wire constituting it, the necessity of taking out the securing staples usually employed for holding the strand to the post and then taking up the slack by forming the surplus wire into a loop between the fence post and afterward applying the holding staples, is entirely overcome. It will also be observed that by my method of taking up the slack the surplus wire is disposed of by passing it about the post and is also made to constitute means for securing the strand to the post. This enables me to dispense with the staples ordinarily employed although the same may be used if desired, for temporarily attaching the strands to the post or as a support for the wire until the same is drawn tight and secured to the post and for such illustration a staple is illustrated in the drawings but it is not essential as my method illustrated and described answers all purposes. This method also permits an expeditious tightening of the fence strands at any time by simply applying the implement and drawing the surplus wire around the post and then tightening up the binding wire.

Having described my invention and set forth its merits, what I claim is—

1. The implement herein described comprising the lever, the swinging arms connected thereto and provided with toothed ends, and the holding prong having a hinged connection with said lever, substantially as and for the purposes described.

2. The implement herein described comprising the lever, the toothed arms hinged to the bolt pivotally connected with the lever, and the holding prong having a hinged connection with the lever, substantially as and for the purposes described.

3. The implement herein described comprising the lever, having laterally swinging toothed arms pivotally connected with the lever, substantially as and for the purposes described.

4. The implement herein described, comprising a lever, and two arms connected with the lever to swing to and from each other and from the lever and provided with hook ends, the connection of the lever to the arms being at a distance from the lower end of the lever; whereby said arms are adapted to lie on opposite sides of a fence post and engage a fence strand on opposite sides of the post, substantially as and for the purposes described.

In testimony whereof I affix my signature in presence of two witnesses.

JOHN WHITTAKER.

Witnesses:
J. E. KELLEY,
J. H. BAYSTON.